United States Patent
Wang et al.

(10) Patent No.: US 7,565,557 B2
(45) Date of Patent: Jul. 21, 2009

(54) POWER CONTROL CIRCUIT FOR UNIVERSAL SERIAL BUS

(75) Inventors: Dao-Wei Wang, Shenzhen (CN); Chung-Chi Huang, Taipei Hsien (TW); Hsiao-Yuan Niu, Taipei Hsien (TW); Qin Wu, Shenzhen (CN)

(73) Assignees: Hong Fu Jin Precision Industry (ShenZhen) Co., Ltd., Shenzhen, Guangdong Province (CN); Hong Hai Precision Industry Co., Ltd., Tu-Cheng, Taipei Hsien (TW)

( * ) Notice: Subject to any disclaimer, the term of this patent is extended or adjusted under 35 U.S.C. 154(b) by 255 days.

(21) Appl. No.: 11/309,474

(22) Filed: Aug. 11, 2006

(65) Prior Publication Data

US 2007/0079157 A1 Apr. 5, 2007

(30) Foreign Application Priority Data

Aug. 19, 2005 (CN) .................. 200510036753.9

(51) Int. Cl.
*G06F 1/00* (2006.01)
(52) U.S. Cl. .................. 713/300; 713/320; 713/340; 710/36
(58) Field of Classification Search .............. 713/300, 713/320, 340; 710/36
See application file for complete search history.

(56) References Cited

U.S. PATENT DOCUMENTS

| 6,362,610 | B1 | | 3/2002 | Yang | |
|---|---|---|---|---|---|
| 7,024,569 | B1 | * | 4/2006 | Wright et al. | ................ 713/300 |
| 7,197,578 | B1 | * | 3/2007 | Jacobs | .......................... 710/14 |
| 2003/0070103 | A1 | * | 4/2003 | Kim | ........................... 713/300 |
| 2003/0233499 | A1 | * | 12/2003 | Choi | ............................ 710/36 |
| 2005/0144495 | A1 | * | 6/2005 | Nakajima et al. | ........... 713/340 |
| 2005/0162017 | A1 | * | 7/2005 | Chin et al. | ..................... 307/44 |

OTHER PUBLICATIONS

Micrel "Programmable Current Limit High-Side Switch" Micrel Inc. Jun. 200.*

* cited by examiner

*Primary Examiner*—Thomas Lee
*Assistant Examiner*—Vincent T Tran
(74) *Attorney, Agent, or Firm*—Wei Te Chung

(57) ABSTRACT

A power control circuit of a universal serial bus (USB) includes a USB interface, a north bridge chipset and a current control circuit. The USB interface has a power pin and a plurality of data pins. The north bridge chipset has a state pin and a plurality of signal pins connected to the data pins of the USB interface respectively. The current control circuit is connected between the power pin of the USB interface and the state pin of the north bridge chipset, the north bridge chipset controls the state of the current control circuit and further controls the output power at the power pin of the USB interface. The power control circuit can offer different output powers in accordance with different external devices.

20 Claims, 2 Drawing Sheets

POWER CONTROL CIRCUIT FOR UNIVERSAL SERIAL BUS

DESCRIPTION

1. Field of the Invention

The present invention relates in general to a power control circuit, and more particularly to a power control circuit for a USB interface which can provide varied power to external devices connected to a motherboard of a personal computer.

2. Description of Related Art

To facilitate the linking of various external peripheral devices with different system terminals, major international companies (including Compaq, Intel, Microsoft and NEC) developed the Universal Serial Bus (USB) interface in 1998. Ever since Microsoft Windows 98 operating system started providing built-in programs for driving USB interface peripheral devices, the application of USB products has been expanding.

A USB interface provides up to 500 mA of current at 5 volts, providing 2.5 watts of power, which limits expansion of application of USB products that have a greater power requirement.

What is needed, therefore, is a power control circuit that can provide higher power to a device using a USB interface.

SUMMARY OF INVENTION

An exemplary power control circuit of a Universal Serial Bus (USB) includes a USB interface, a north bridge chipset, and a current control circuit. The USB interface has a power pin and a plurality of data pins. The north bridge chipset has a state pin and a plurality of signal pins connected to the data pins of the USB interface respectively. The current control circuit is connected between the power pin of the USB interface and the state pin of the north bridge chipset, the north bridge chipset controls the state of the current control circuit and further controls the output power at the power pin of the USB interface.

The power control circuit of a universal serial bus can be utilized to offer different output powers in accordance with different external devices.

Other advantages and novel features will become more apparent from the following detailed description of preferred embodiments when taken in conjunction with the accompanying drawings, in which:

DETAILED DESCRIPTION

Figure 1:
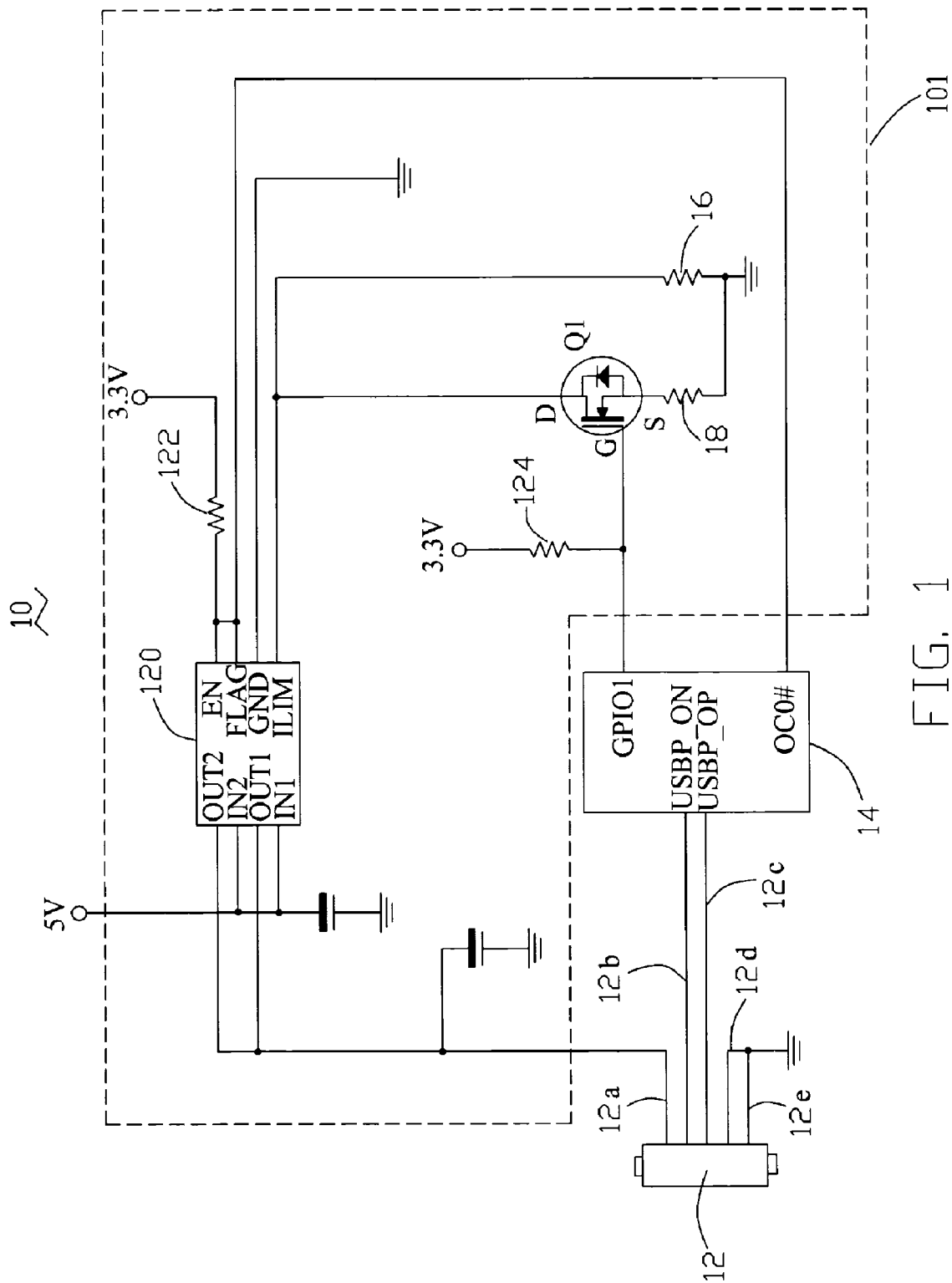
FIG. 1 is a circuit diagram of a power control circuit of a USB in accordance with a first preferred embodiment of the present invention.

Referring to FIG. 1, a power control circuit for a USB 10 is applied in a computer system and comprises a USB interface 12, a north bridge chipset 14, and a current control circuit 101.

The USB interface 12 comprises 5 pins 12a~12e in the current USB pin definition. Pin 12a is a power pin, pins 12b and 12c are data I/O pins, pins 12d and 12E are connected to ground.

The north bridge chipset 14 comprises two signal pins USBP_0N and USBP_0P, a state pin GPIO1, and an over current indicator pin OC0#. The data I/O pins 12b and 12c of the USB interface 12 are coupled to the signal pins USBP_0N and USBP_0P of the north bridge chipset 14.

The current control circuit 101 comprises a transistor Q1, a 3.3V power supply, a first resistor 16, a second resistor 18, and a switch 120. The switch 120 is, in this preferred embodiment, an MIC2545A-1YM chipset. The switch 120 comprises two input pins IN1 and IN2, two output pins OUT1 and OUT2, an enable pin EN, a protect pin FLAG, a ground pin GND, and an over current indicator pin ILIM. The input pins IN1 and IN2 of the switch 120 are connected to a 5V power source. The output pins OUT1 and OUT2 are connected to the power pin 12a of the USB interface 12. The ground pin GND of the switch 120 is grounded. The FLAG pin of the switch 120 is connected to the OC0# pin of the north bridge chipset 14. The EN pin of the switch 120 is connected to the 3.3V power supply via a resistor 122. The FLAG pin is connected to a node between the EN pin and the resistor 122. The ILIM pin is connected to ground via the first resistor 16. A gate G of the transistor Q1 is connected to the GPIO1 pin of the north bridge chipset 14, a source S of the transistor Q1 is grounded via the second resistor 18, and a drain D of the transistor Q1 is connected to the ILIM pin of the switch 120. A node between the GPIO1 pin and the gate G of the transistor Q1 is connected to the 3.3V power supply via a resistor 124.

When a power selection USB HIGH Current in BIOS in the computer system is set to disable, a low level is output at the GPIO1 pin of the north bridge chipset 14, and the transistor Q1 is turned off. Only the first resistor 16 is connected between the ILIM pin and ground, the resistance of the first resistor 16 is about 458 ohm, which was selected according to a formula in a manufacturer's specification of the chipset MIC2545A-1YM, 76.8 ohm<RRET<459 ohm,

ILIMIT=230/RRET, wherein RRET denotes the resistance between the ILIM pin and the ground, ILIMIT denotes output current at the ILIM pin. Thus, current output at the USB interface 12 is 0.5 A, for a power output at the USB interface 12 of 2.5 W. When the power selection USB HIGH Current in BIOS is set to enable, a high level signal is output at the GPIO1 pin of the north bridge chipset 14, and the transistor Q1 is turned on. The second resistor 18 is also connected between the ILIM pin and ground, the resistance of the second resistor 18 is about 115 ohm, which was selected according to the following equation:

$$RRET=(R2+RZ)*R1/(R2+RZ+R1)$$

Wherein, RZ denotes the resistance of the transistor Q1 and is 3 ohm, R1 denotes the resistance of the first resistor 16, and R2 denotes the resistance of the second resistor 18, so current output at the USB interface 12 is 2 A, for a power output at the USB interface 12 of 10 W. The resistance of the first and second resistor 16 and 18 may be varied according to need. The power control circuit 10 offers different powers due to selectability of the resistance of the first and second resistors.

When output current of the switch 120 is larger than 2 A, a low level signal is output at the FLAG pin, and the north bridge 14 receives an over current signal through the OC0# pin and does not communicate with the USB interface 12.

Figure 2:
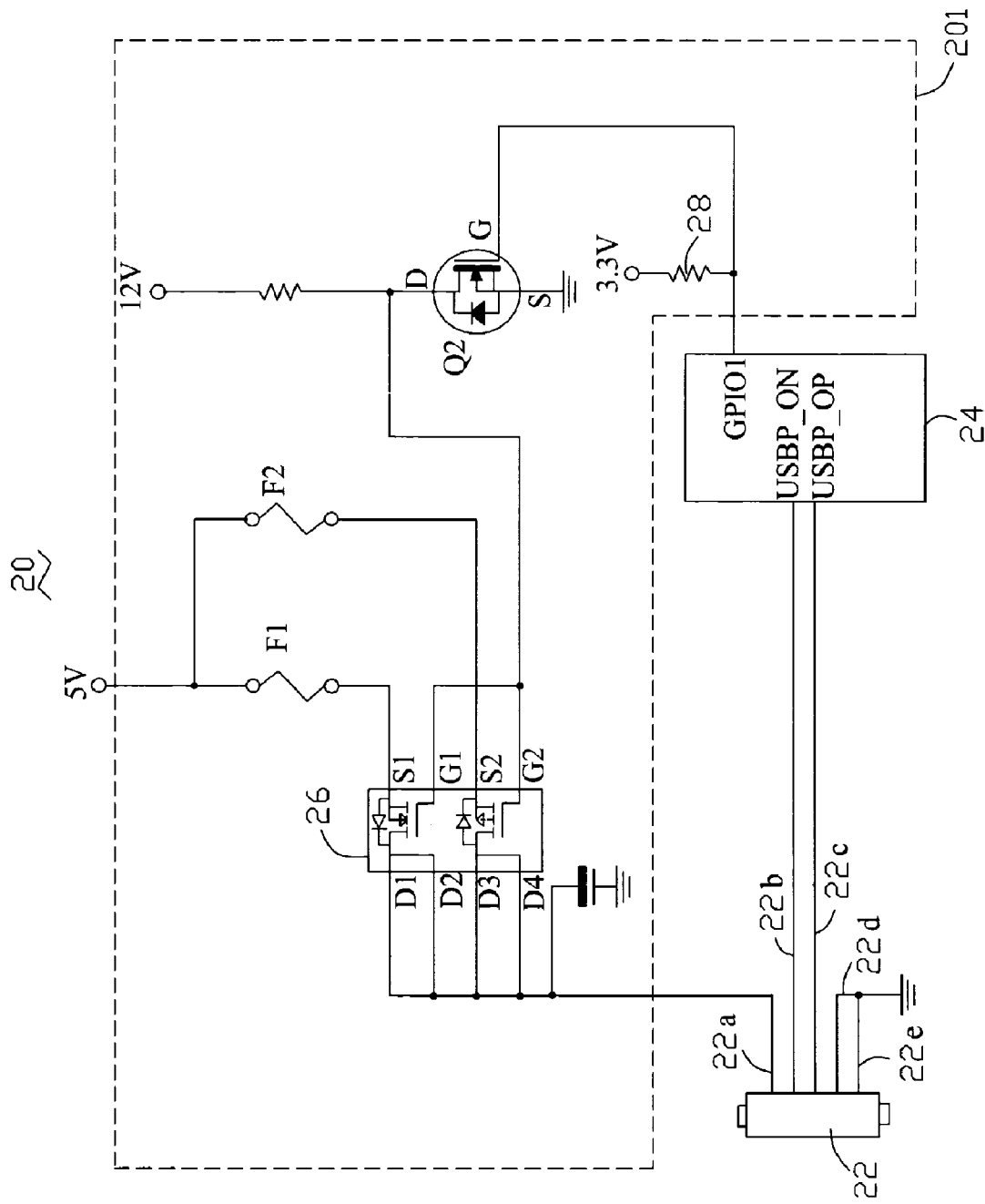
FIG. 2 is a circuit diagram of a power control circuit of a USB in accordance with a second preferred embodiment of the present invention.

Referring to FIG. 2, another embodiment is shown. A power control circuit for a USB 20 is applied in a computer system and comprises a USB interface 22, a north bridge chipset 24, and a current control circuit 201.

The USB interface 22 comprises 5 pins 22a~22e in the current USB pin definition. Pin 22a is a power pin, pins 22b and 22c are data I/O pins, pins 22d and 22E are ground pins connected to ground.

The north bridge chipset 24 comprises two signal pins USBP_0N and USBP_0P, and a state pin GPIO1. The data I/O pins 22b and 22c are coupled to the signal pins USBP_0N and USBP_0P of the north bridge chipset 24.

The current control circuit 201 comprises a transistor Q2, a 3.3V power supply, a 12V power supply, a first fuse F1, a second fuse F2, and a switch 26. The switch 26 is a dual transistor switch. In this preferred embodiment, the switch 26 is a FDS8958A chipset. Rated current of the first fuse F1 is 0.5 A, and a rated current of the second fuse F2 is 2 A. The switch 26 comprises a first input pin S1, a second input pin S2, a first state control pin G1, a second state control pin G2, and four output pins D1~D4. The four output pins D1~D4 are all connected to the power pin 22a of the USB interface 22. The first input pin S1 is connected to the 5V power supply via the first fuse F1, the second input pin S2 is connected to the 5V power supply via the second fuse F2. The first state control pin G1 and the second state control pin G2 are connected to the 12V power supply. A drain D of the transistor Q2 is connected to the 12V power supply and a node between the first state control pin G1 and the second state control pin G2, a gate G of the transistor Q2 is connected to the GPIO1 pin of the north bridge chipset 24. A node between the gate of the transistor Q2 and the GPIO1 pin of the north bridge chipset 24 is connected to the 3.3V power supply via a resistor 28. A source S of the transistor Q2 is grounded.

The state of the GPIO1 pin is controlled by the BIOS. When the power selection USB HIGH Current in the BIOS is set to enable, a high level signal is output at the GPIO1 pin of the north bridge chipset 24, and the transistor Q2 is turned on. The second input pin S2 and the output pins D3 and D4 are connected in the circuit, current output at the USB interface 22 is 2 A for a power output at the USB interface 22 of 10 W.

When the power selection USB HIGH Current in BIOS is set to disable, a low level signal is output at the GPIO1 pin of the north bridge chipset 24, and the transistor Q2 is turned off. The first input pin S1 and the output pins D1 and D2 are connected in the circuit, current output at the USB interface 22 is 0.5 A for a power output at the USB interface 22 of 2.5 W.

Ratings of the first fuse F1 and the second fuse F2 are selectable according to need. The power control circuit 20 offers different powers due to the selectability of the type of the first and second fuses.

It is to be understood, however, that even though numerous characteristics and advantages of the present embodiments have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power control circuit of a Universal Serial Bus (USB), comprising:
    a USB interface having a power pin and a plurality of data pins;
    a north bridge chipset having a state pin and a plurality of signal pins, the signal pins connected to the data pins of the USB interface respectively; and
    a current control circuit comprising a transistor, a switch, and a limitation unit, wherein a gate of the transistor is connected to the state pin of the north bridge chipset, the limitation unit is connected to the transistor and the switch, the switch is also connected to the power pin of the USB interface, wherein the north bridge chipset controlling a state of the transistor via the state pin, thereby controlling the limitation unit to adjust output power from the switch to the power pin of the USB interface.

2. The power control circuit as claimed in claim 1, wherein the limitation unit comprises a first resistor and a second resistor, the switch comprises a plurality of input pins connected to a first power supply, a plurality of output pins coupled to the power pin of the USB interface, a current limit (ILIM) pin, a flag (FLAG) pin connected to a second power supply, an enable (EN) pin connected to the second power supply, and a ground (GND) pin connected to ground; the ILIM pin is connected to ground via the first resistor and connected to a drain of the transistor, a source of the transistor is grounded via the second resistor.

3. The power control circuit as claimed in claim 2, wherein the north bridge chipset comprises an over-current (OC0#) pin connected to the FLAG pin of the switch, to protect the switch.

4. The power control circuit as claimed in claim 2, wherein the switch is a MIC2545A-1YM chipset.

5. The power control circuit as claimed in claim 2, wherein resistance of the first resistor is about 458 ohm, and the resistance of the second resistor is about 150 ohm.

6. The power control circuit as claimed in claim 2, wherein resistances of the first and second resistors are so arranged that a first resistance between the ILIM pin of the switch upon the condition that the transistor is on is different from a second resistance between the ILIM pin of the switch upon the condition that the transistor is off.

7. The power control circuit as claimed in claim 1, wherein the limitation unit comprises a first fuse and a second fuse, the switch is a dual transistor switch, wherein the dual transistor switch comprises a first input pin connected to a first power supply via the first fuse, a second input pin connected to the first power supply via the second fuse, a plurality of output pins connected to the power pin of the USB interface, and a first state pin and a second state pin connected to a second power supply and a drain of the transistor, wherein a source of the transistor is grounded.

8. The power control circuit as claimed in claim 7, wherein the dual transistor switch is a FDS8958A chipset.

9. The power control circuit as claimed in claim 7, wherein the rated current of the first fuse is about 2A, and the rated current of the second fuse is about 0.5A.

10. A power control circuit of a Universal Serial Bus (USB), comprising:
    a USB interface having a power pin and a plurality of data pins;
    a north bridge chipset having a state pin and a plurality of signal pins connected to the data pins of the USB interface respectively; and
    a current control circuit comprising a transistor, a switch, and a limitation unit, wherein a gate of the transistor is connected to the state pin of the north bridge chipset, the limitation unit is connected to the transistor and the switch, the switch is also connected to the power pin of the USB interface, wherein the transistor receives a control signal sent from the north bridge chipset and control the limitation unit to adjust output power from the switch to the power pin of the USB interface.

11. The power control circuit as claimed in claim 10, wherein the switch comprises a MIC2545A-1YM chipset, the limitation unit comprises a first resistor and a second resistor, the MIC2545A-1YM chipset has a plurality of input pins connected to a first power supply, a plurality of output pins coupled to the power pin of the USB interface, a current limit (ILIM) pin and a flag (FLAG) pin connected to a second power supply, an enable (EN) pin connected to the first power supply, and a ground (GND) pin being grounded, the ILIM pin is connected to the ground via the first resistor and connected to a drain of the transistor, a source of the transistor is grounded via the second resistor.

12. The power control circuit as claimed in claim 10, wherein the limitation unit comprises a first fuse and a second fuse, the switch is a dual transistors switch, wherein the dual transistors switch has a first input pin connected to a first power supply via the first fuse, a second input pin connected to the first power supply via the second fuse, a plurality of output pins connected to the power pin of the USB interface, a first state pin and a second pin connected to a second power supply and a drain of the transistor, a source of the transistor is grounded.

13. The power control circuit as claimed in claim 12, wherein the dual transistor switch is a FDS8958A chipset.

14. The power control circuit as claimed in claim 12, wherein the rated currents of the first and second fuses are different.

15. A power control circuit, comprising:
- a USB interface configured for receiving USB interface peripheral devices dissipating different powers, the USB interface having a power pin and a plurality of data pins;
- a north bridge chipset having a state pin and a plurality of signal pins connected to the data pins of the USB interface respectively; and
- a current control circuit comprising a transistor, a switch, and a limitation unit, wherein a gate of the transistor is connected to the state pin of the north bridge chipset, the limitation unit is connected to the transistor and the switch, the switch is also connected to the power pin of the USB interface, wherein the transistor is configured for receiving different control signals sent from the state pin of the north bridge chipset and controlling the limitation unit to adjust corresponding different currents output from the switch to the power pin of the USB interface whereby the USB interface is capable of fitting the USB interface peripheral devices dissipating different powers.

16. The power control circuit as claimed in claim 15, wherein the limitation unit comprises a plurality of resistors, the switch comprises a plurality of input pins connected to a first power supply, a plurality of output pins coupled to the power pin of the USB interface, a current limit (ILIM) pin, an enable (EN) pin connected to a second power supply, and a ground (GND) pin connected to ground; the ILIM pin is connected to ground via the plurality of resistors in parallel, and the transistor is connected between the ILIM pin and one of the resistors configured for selectively connecting said one of the resistors to the ILIM pin.

17. The power control circuit as claimed in claim 16, wherein the transistor comprises a drain connected to the ILIM pin, a source grounded via said one of the resistors.

18. The power control circuit as claimed in claim 15, wherein the limitation unit comprises a first fuse and a second fuse, the switch is a dual transistor switch, wherein the dual transistor switch comprises a first input pin connected to a first power supply via the first fuse, a second input pin connected to the first power supply via the second fuse, a plurality of output pins connected to the power pin of the USB interface, a first state pin and a second state pin connected to a second power supply and the transistor which is configured for selecting one of the first and second fuses to connect the first power supply with the power pin.

19. The power control circuit as claimed in claim 18, wherein transistor comprises a drain connected to a node among the first state pin, the second state pin and the second power supply, a source grounded.

20. The power control circuit as claimed in claim 18, wherein the dual transistor switch is a FDS8958A chipset.

* * * * *

UNITED STATES PATENT AND TRADEMARK OFFICE
CERTIFICATE OF CORRECTION

| | | |
|---|---|---|
| PATENT NO. | : 7,565,557 B2 | Page 1 of 1 |
| APPLICATION NO. | : 11/309474 | |
| DATED | : July 21, 2009 | |
| INVENTOR(S) | : Wang et al. | |

It is certified that error appears in the above-identified patent and that said Letters Patent is hereby corrected as shown below:

Please replace Section (73) regarding "Assignees" on the front page of the Patent with the following:

(73) Assignees: Hong Fu Jin Precision Industry (ShenZhen) Co., Ltd., Shenzhen, Guangdong Province (CN); Hon Hai Precision Industry Co. Ltd., Tu-Cheng, Taipei Hsien (TW).

Signed and Sealed this
Ninth Day of August, 2011

David J. Kappos
*Director of the United States Patent and Trademark Office*